March 27, 1951 C. S. TOWNSEND 2,546,481
ELECTRICAL REGULATOR
Filed Oct. 8, 1946
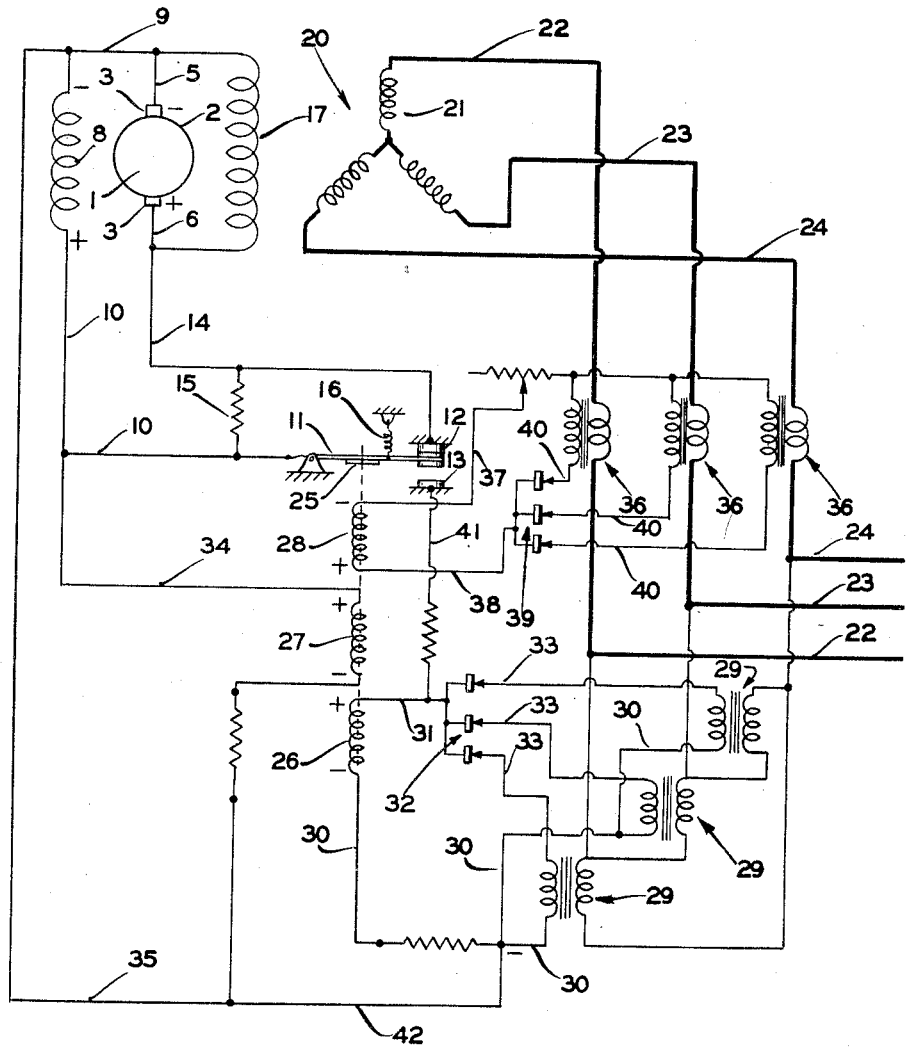
-INVENTOR-
CARROLL S. TOWNSEND
BY
-ATTORNEY- Patented Mar. 27, 1951

2,546,481

UNITED STATES PATENT OFFICE 2,546,481

ELECTRICAL REGULATOR

Carroll S. Townsend, Fair Haven, N. J., assignor to Bendix Aviation Corporation, Teterboro, N. J., a corporation of Delaware Application October 8, 1946, Serial No. 701,939

3 Claims. (Cl. 322—6)

The present invention relates to electrical regulators for alternators and more particularly to novel means for preventing the field of an exciter from reversing polarity upon a short occurring in the output of the alternator.

An object of the invention is to provide a novel voltage regulator for an alternator including switch means for restoring the exciter field to proper polarity upon reversal of the field.

Another object of the invention is to provide a novel Tirrill type regulator including a regulating switch arm and contact and a third contact engageable by the switch arm upon reversal of the polarity of the exciter field for restoring the exciter field to proper polarity by the switch arm closing the third contact and thereby a circuit which applies a proper polarity to the exciter field so that the regulator may once again work properly.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a diagrammatic view illustrating an electrical circuit embodying one form of the invention.

In the form of the invention shown in the drawing, there is provided a direct current generator or exciter of conventional type, and indicated generally by the numeral 1.

The exciter 1 has an armature winding, not shown, but which may be of conventional type. Connections from the armature winding lead to a commutator 2 having brushes 3 and output lines 5 and 6, to which there is applied in normal operation a negative and positive potential, respectively.

The exciter 1 has a field winding 8 connected at one end to the output line 5 by an electrical conductor 9. The opposite end of the exciter field winding 8 is connected by a suitable electrical conductor 10 to the regulating switch arm 11 of a Tirrill type regulator. The regulating arm 11 is arranged so as to cooperate with suitable switch contacts 12 and 13. The contact 12 is connected by an electrical conductor 14 to the positively charged output line 6 of the exciter 1. A resistor 15 is connected between the lines 10 and 14, while a spring 16 biases the switch arm 11 in a direction for closing contact 12 to shunt the resistor 15.

The output of the exciter 1 is controlled by regulating the excitation of the field winding 8 through the action of the Tirrill type regulating arm 11, as will be explained hereinafter.

The output of the direct current generator or exciter 1 is connected by conductors 5 and 6 to the exciting field 17 of an alternator, indicated generally by the numeral 20, and having output windings 21. The exciting field winding 17 may be mounted on the same drive shaft as the armature 2, and may be rotated in relation to the output windings 21 so as to induce an alternating current in windings 21 having a value dependent upon the excitation of winding 21 by the exciter 1. The shaft for rotating the armature 2 and exciting field winding 21 may be driven through a suitable constant speed drive from the aircraft engine or other suitable power source.

Main output lines 22, 23 and 24 lead from the output windings 21 to a suitable electrical load, not shown.

The Tirrill type regulating switch arm 11 has an armature member 25, whereby the arm 11 is operated by the electromagnetic forces applied by windings 26, 27 and 28.

The main or voltage winding 26 is fed from transformers 29 having primary windings connected across the main lines 22, 23 and 24, and secondary windings having one end thereof connected through lines 30 to one end of the winding 26. The opposite end of the winding 26 is connected through conductor 31 to a rectifier 32, and through conductor 33 to the opposite end of the secondary windings of the transformers 29. Thus, the main winding 26 is responsive to the voltage across the lines 22, 23 and 24.

The winding 27 is connected across the exciter field 8 through lines 34 and 35. The winding 27 during normal operation has a like polarity to the winding 26, and is responsive to the voltage across the exciter field 8. The winding 8 limits maximum voltage applied to the exciter field 8.

The third or compounding winding 28 has opposite polarity to that of winding 26 and 27.

The compounding winding 28 is fed from current transformers 36 having primary windings connected in the main lines 22, 23 and 24, and secondary windings having one end thereof connected through line 37 to one end of the winding 28. The opposite end of the winding 28 is connected through conductor 38 to rectifier 39 and through conductor 40 to the opposite end of the secondary windings of the transformers 36.

It will be seen that the compounding winding 28 is connected so as to have an opposite polarity to that of windings 26 and 27, and is energized in proportion to line current from the current transformers 36 in the main lines 22, 23 and 24.

The compounding winding 28 opposes the winding 26, and thus tends to increase the voltage setting of the regulator 11 as the current or load increases, while the voltage winding 26 exerts an electromagnetic force tending to open the contact 12 upon the output voltage exceeding a predetermined value so as to decrease the energization of the exciter field 8, and thereby the excitation of the exciting winding 17 of the alternator 21 and accordingly, the voltage output at lines 22, 23 and 24.

In the latter arrangement, in the event of a short across the output lines 22, 23 or 24, when the short is cleared, the field of the exciter may be reversed. This may be effected by a kick back from the alternator resulting upon the collapsing of the magnetic field of the output winding 21 effected by the short, and in turn inducing a voltage in the exciting field winding 17, which may be of reverse polarity so as to cause a reversal of the polarity of the exciter field. Thus upon continued operation, the exciter may tend to operate with opposite polarity to that shown.

Under such conditions, the polarity of the winding 27 will be reversed so as to assist rather than oppose the winding 28, and causing in turn the regulating switch arm 11 to be biased in a direction opening the contact 12.

Thus, the regulator would tend to operate in the wrong direction.

The feature of the present invention is the provision of novel means to restore the exciter field 8 to its proper polarity, and to assure proper operation of the regulator. This is specifically effected by providing the third contact 13, which is connected through a conductor 41 to the positively charged conductor 31, while the conductor 35 is connected by conductor 42 to the negatively charged conductor 30. Thus upon the switch arm 11 being biased downwardly a sufficient extent due to the reversal of polarity of the exciter field 8, the contact 13 will be closed, whereupon the exciter winding 8 will be restored to proper polarity, and the regulator will operate in the normal proper manner once again.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a line voltage regulating system for a generator including an exciting field winding, an exciter connected across the exciting field winding, a field winding for said exciter, a resistance connected in circuit with said exciter and exciter field winding, a movable switch arm and contact cooperating for shunting the resistance; the improvement comprising a plurality of electromagnetic windings for biasing said switch arm in a direction for opening said contact, one of said electromagnetic windings responsive to the voltage output of said generator, another of said electromagnetic windings responsive to the voltage across the exciter field winding, and a third electromagnetic winding responsive to the current output from said generator, said first and second mentioned electromagnetic windings normally having a like polarity and the third electromagnetic winding having a polarity normally acting in opposition to the polarity of said first and second mentioned electromagnetic windings, another contact cooperating with said switch arm, said second electromagnetic winding effective upon a reversal in the polarity of said exciter field winding to cause said switch arm to close said other contact, and means connected in circuit with said exciter field winding upon the closing of said contact for correcting the polarity of the field winding of the exciter.

2. For use with a generator having a field winding, the combination, comprising a movable switch arm and a contact in cooperating relation for controlling the excitation of said field winding, a plurality of electromagnetic windings for biasing said switch arm in a direction for opening said contact, one of said electromagnetic windings responsive to the voltage output of said generator, another of said electromagnetic windings responsive to the voltage across the field winding, and a third electromagnetic winding affecting said switch arm and responsive to the current output from said generator, said first and second mentioned electromagnetic windings normally having a like polarity and the third electromagnetic winding having a polarity normally acting in opposition to the polarity of said first and second mentioned electromagnetic windings, another contact cooperating with said switch arm, said second mentioned electromagnetic winding effective upon a reversal of the polarity of said field winding to cause said switch arm to close said other contact for correcting the polarity of the field winding.

3. For use with a generator having a field winding, the combination comprising a movable switch arm and a contact in cooperating relation for controlling the excitation of said field winding, electromagnetic means responsive to a predetermined electrical condition of said generator for operating said switch arm so as to maintain said condition substantially constant, said electromagnetic means including a winding responsive to the polarity of the field winding, another contact cooperative with said switch arm, said electromagnetic winding effective upon a reversal of the polarity of said field winding to cause said switch arm to close said other contact for correcting the polarity of the field winding.

CARROLL S. TOWNSEND.

REFERENCES CITED

The following references are of record in the file of this patent:

UNITED STATES PATENTS

| Number | Name | Date |
|---|---|---|
| 1,966,232 | Ashbaugh et al. | July 10, 1934 |
| 1,985,679 | Jenkins | Dec. 25, 1934 |
| 2,208,416 | Friedlander et al. | July 16, 1940 |
| 2,259,135 | Hill | Oct. 14, 1941 |